Fig. 1.

INVENTORS.
ANTHONY T. ZAPPIA and
MAYNARD O. BOUGH
BY Hood, Gust & Irish
Attorneys

INVENTORS.
ANTHONY T. ZAPPIA and
BY MAYNARD O. BOUGH
Hood, Gust & Irish
Attorneys

INVENTORS.
ANTHONY T. ZAPPIA and
MAYNARD O. BOUGH
BY Hood, Gust & Irish
Attorneys March 25, 1969 A. T. ZAPPIA ET AL 3,434,820
HOLLOW GLASSWARE FORMING MACHINE
Filed Feb. 3, 1965

INVENTORS.
ANTHONY T. ZAPPIA and
MAYNARD O. BOUGH
BY Hood, Gust & Irish
Attorneys

Fig. 20.

United States Patent Office
3,434,820
Patented Mar. 25, 1969

3,434,820
HOLLOW GLASSWARE FORMING MACHINE
Anthony T. Zappia, 6230 E. 56th St. 46226, and Maynard O. Bough, Jr., 8042 Campbell Ave. 46250, both of Indianapolis, Ind.
Filed Feb. 3, 1965, Ser. No. 430,105
Int. Cl. C03b 9/26
U.S. Cl. 65—223         11 Claims

ABSTRACT OF THE DISCLOSURE

A machine for forming hollow glassware in which a parison mold travels in an oscillatory path between a charging station and pressing station, and in which one or more segmental neck rings travel in a closed path from said pressing station to a blowing station, thence to a delivery station and thence back to said pressing station, with a dwell period at each of said stations although said neck rings are transported on an endless, flexible strand which travels continuously at uniform velocity, the neck rings, parison mold and press plunger sealing head being cooperatively formed to afford sealing closure of each neck ring during the pressing operation and automatic means being provided to establish affirmative support for the parison mold during the pressing operation.

---

The present invention relates to a machine for forming hollow glassware and its primary object is to simplify the procedure and mechanism for manufacturing such hollow ware.

A further object of the invention is to reduce the cost and complexity of such machinery. Another object is to provide a machine of the character under consideration in which space requirements are minimized.

Still another object of the invention is to provide novel transfer means for transporting a parison from a pressing conveyor.

Still further objects of the invention will appear as the description proceeds.

To the accomplishment of the above and related objects, our invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
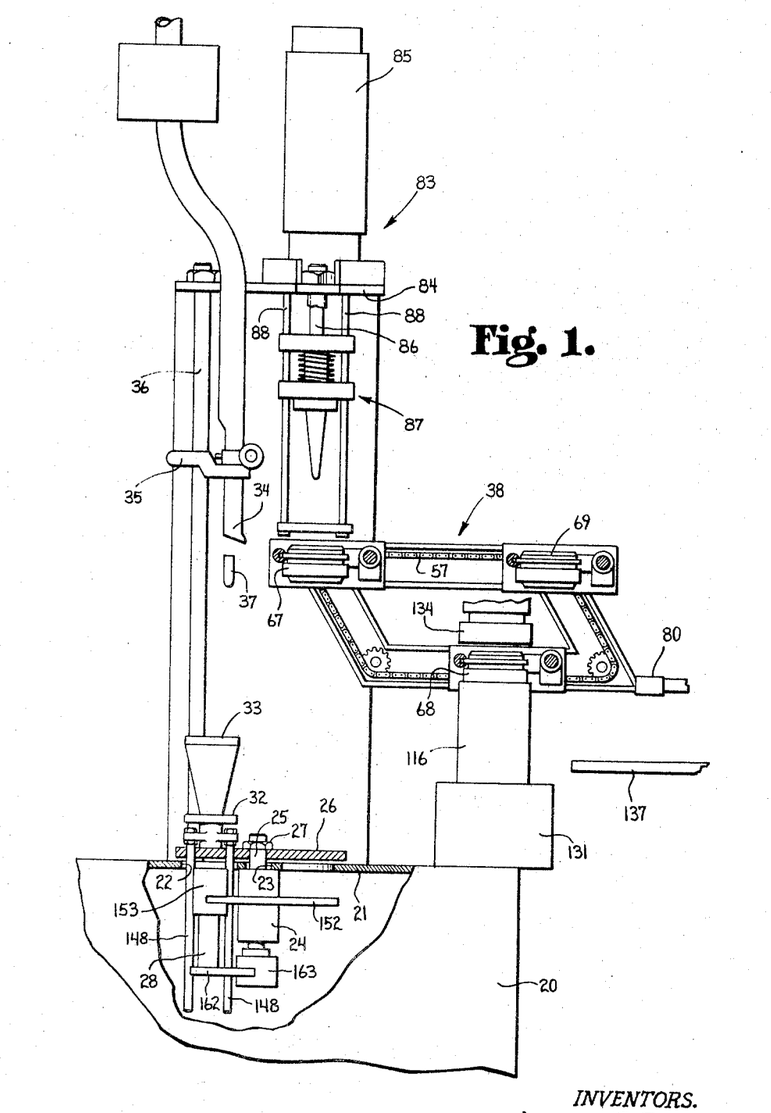
FIG. 1 (sheet 1) is an elevation of a glass forming machine constructed in accordance with our invention, parts being broken away or shown in section for clarity of illustration, and illustrating the machine parts in charge-receiving positions.

Referring more particularly to FIG. 1, it will be seen that the illustrated machine comprises a base 20 providing a horizontal floor 21 which is provided with a substantially semi-circular slot 22 (FIGS. 1 and 6) and with a central aperture 23 concentric with respect to said slot. A 180° oscillating fluid motor 24 is supported below said floor 22 with its spindle 25 projecting through the aperture 23 and carrying a turntable 26 which is oscillably supported on the floor 22 and is secured to said spindle by means of a nut 27 or other suitable fastening means.

A reciprocating fluid motor 28 comprises a cylinder secured to the turntable 26 and supported upon an arm 162 fixed to a hub 163 carried by the lower end of motor spindle 25, whereby said motor may travel bodily along the length of the slot 22, the piston rod 30 of said motor penetrating the turntable 26.

Figures 3, 14:
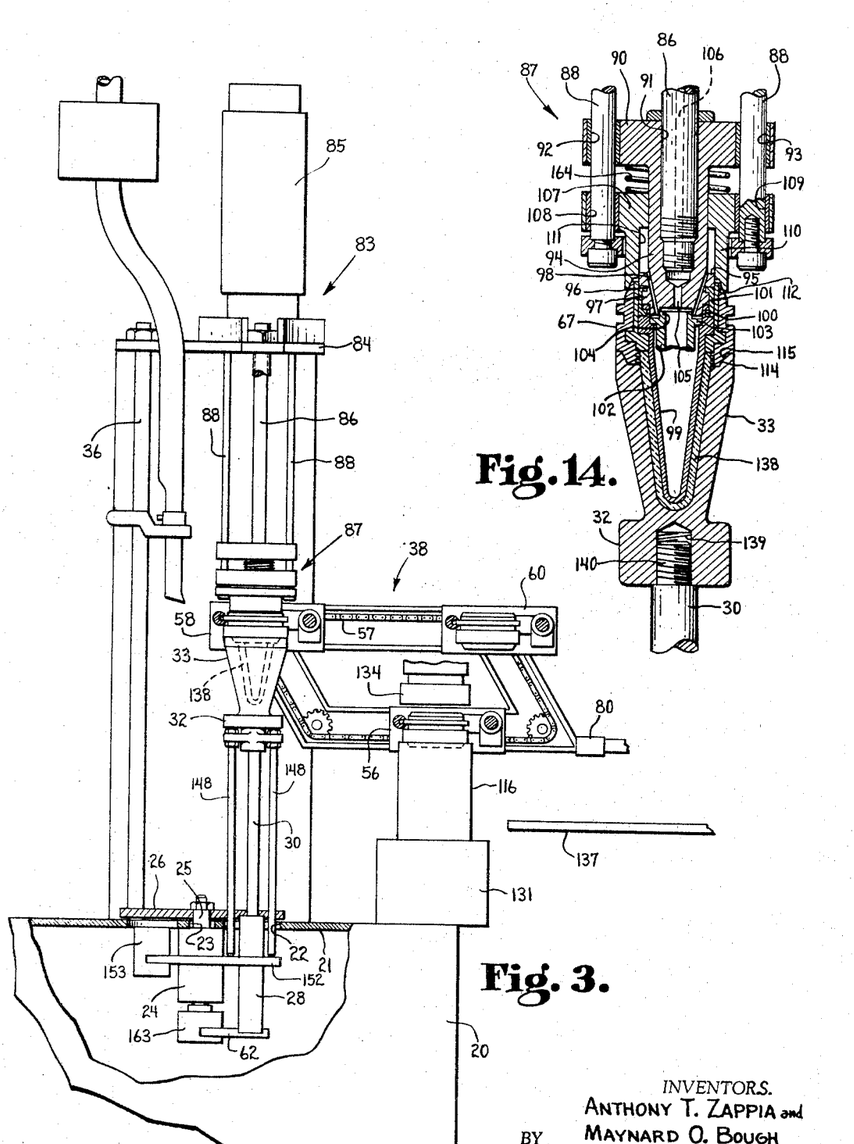
FIG. 3 (sheet 3) is a similar view illustrating the machine parts in pressing condition.
FIG. 14 (sheet 3) is a fragmentary sectional view of the parison mold and the press head assembly in pressing relation with an associated neck ring.

At its upper end, the piston rod 30 supports a parison mold 33 which, as illustrated, is preferably provided with a base or platform 32. Preferably, the parison mold is removably mounted on the piston rod as, for instance, by means of an axial threaded socket 139 in the base 32 receiving a reduced, threaded extension 140 at the upper extremity of the piston rod (FIG. 14).

Fixed to the piston rod 30 at a point below the platform 32 is a cross head 147 (FIG. 7) from the opposite ends of which depend guide rods 148 penetrating the turntable 26 and extending through the slot 22. Each guide rod 148 is preferably threaded near its upper end and carries nuts 149 and 150 disposed respectively above and below the cross head 147 to provide a vertical adjustment for each such guide rod.

Immediately below the level attained by the lower ends 151 of the guide rods 148 when the piston rod 30 is fully elevated, a support arm 152 is mounted, in a slot or guideway 160 formed in a bracket 153 for oscillation about a post 161 (FIG. 6) in a horizontal plane adjacent the pressing station. A double acting fluid motor 154 has its cylinder suitably supported on the machine, and its piston rod 156 carries a clevis 155 which is pivotally connected to the arm 152 at 157. The forward edge of the arm 152 is cut away as at 158 to fit around the motor 28 when said motor is at the pressing station; thereby defining fingers 159, 159 which are movable, as the arm 152 swings about its pivotal axis, into and out of registry with the lower ends 151 of the guide rods 148, respectively. When the motor 28 is at the pressing station and the parison 33 has been fully elevated, the motor 154 may be energized to swing the arm 152 into supporting relation with said guide rods, whereby the parison mold may be affirmatively supported during the formation of a parison therein.

A supply tube 34 leading from a reservoir of molten glass (not shown) is suitably supported at a selected level above the turntable 26, and we have suggested a bracket 35 adjustably mounted upon a stanchion 36 supported from the base 20 whereby said supply tube 34 may be adjustably located. By well known means (not shown) a gob 37 of molten glass will be periodically dropped from the supply tube 34 to be caught in the parison mold 33 when the latter is disposed in its position illustrated in FIG. 1 or FIG. 5.

Suitably supported adjacent the base 20 is a novel transfer mechanism indicated generally by the reference numeral 38. Said mechanism comprises a pair of trackways 39 only one of which is illustrated but which are arranged in spaced, mating registry. Each such trackway comprises an upper horizontal rail 40 (FIG. 8), a parallel lower rail 41 and inclined parallel end rails 42 and 43, so that the four rails define a closed, rhombic outer trackway boundary. Fixed with respect to each such set of rails is a rhombic block 44 presenting surfaces 45, 46, 47 and 48 parallel with, and equally spaced from, the several rails 40, 41, 42 and 43, respectively to define the inner boundary of the trackway. As suggested in FIG. 9, each rail and its mating block surface may be the parallel flanges of a U-beam.

Stub axles 49, 50, 51 and 52 are arranged respectively at the outside corners of each trackway and carry sprockets 53, 54, 55 and 56, respectively; and a continuous chain 57 is trained about each set of such sprockets. Three carriers 58, 59 and 60 are equidistantly spaced in the lengths of the chains.

Figure 9:
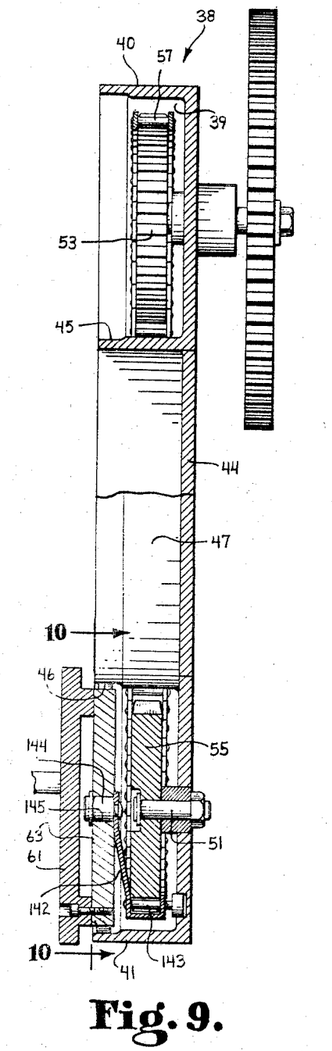
FIG. 9 (sheet 6) is an enlarged sectional view taken substantially on the line 9—9 of FIG. 8, with a carrier at the beginning of its dwell position at the lower, right-hand corner of the trackway.
Figure 10:
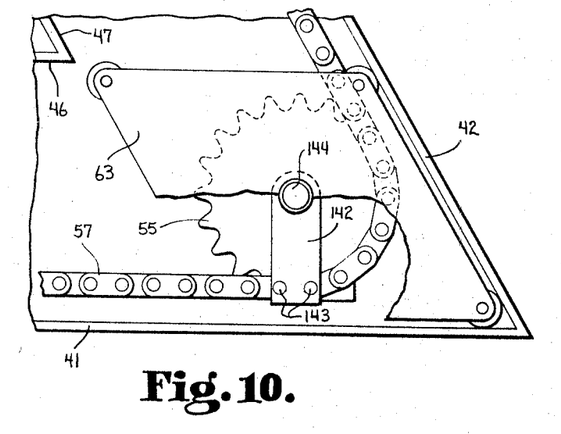
FIG. 10 (sheet 6) is a fragmentary view taken substantially on the line 10—10 of FIG. 9, with a part broken away for clarity of illustration.
Figure 11:
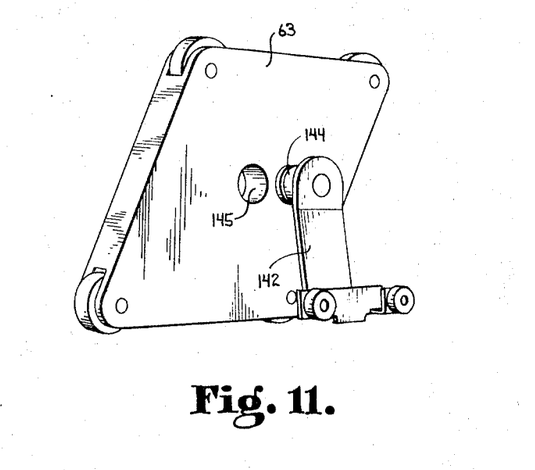
FIG. 11 (sheet 6) is an exploded perspective of a detail.
Figures 12, 13:
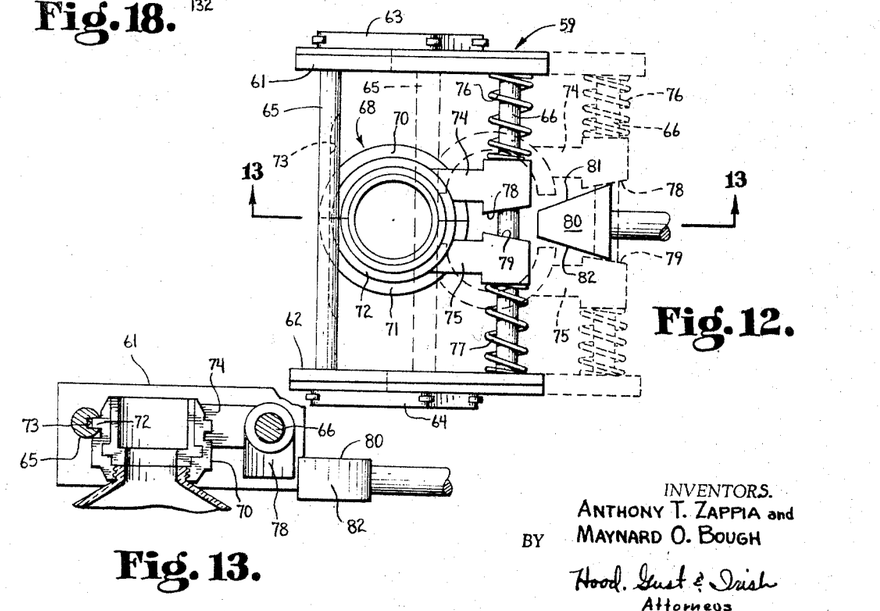
FIG. 12 (sheet 7) is a plan view of a neck ring carrier, showing the manner in which the neck ring is opened to deposit a finished article on the take-off conveyor.
FIG. 13 (sheet 7) is a fragmentary section taken substantially on the line 13—13 of FIG. 12.
Figure 16:
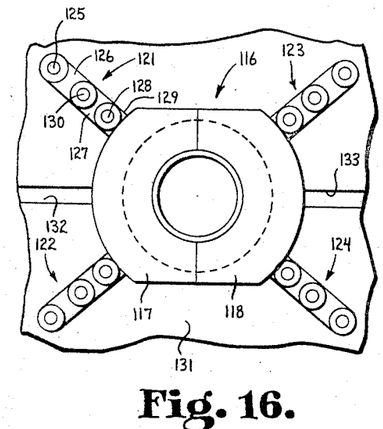
FIG. 16 (sheet 8) is a plan view of the blow mold and its associated parts in closed condition.
Figure 17:
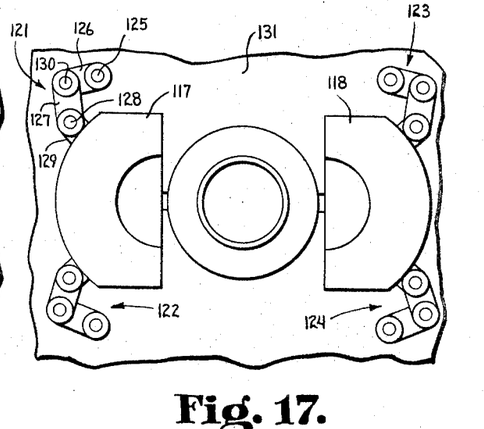
FIG. 17 (sheet 8) is a similar view but showing the blow mold in opened condition.

The three carriers are identical, and therefore, only one will be described in detail. Each such carrier comprises a pair of side plates 61 and 62 (FIG. 12) joined by cross bars 65 and 66. The plate 61 carries a rhombic runner 63 on its external surface while the plate 62 carries a rhombic runner 64 on its outer surface. Each such runner is vertically dimensioned to be guidedly received between the rail 40 and the surface 45 or the rail 41 and the surface 46, and is horizontally dimensioned to be guidedly received between the rail 42 and the surface 47 or between the rail 43 and the surface 48. An arm 142 (FIGS. 9–11) is rigidly secured to the chain 57, as by means of two or more rivets 143 passing through a common chain link, and carries, at its distal end, a trunnion element 144 which is journalled in a central aperture 145 in each block 63 or 64. Thus, as the chain 57 travels about the sprockets, the carriers 58, 59 aand 60 will be entrained therewith. The length of each arm 142 is equal to the pitch diameter of the several sprockets so that, as any carrier reaches a corner of its trackway, its trunnion element 144 will attain coaxial relation to the axle in that corner. Thus, as the proximal end of its arm travels about the periphery of the sprocket, the trunnion element and the carrier will remain stationary as the trunnion element turns in its block aperture; and as the proximal end of the arm leaves the periphery of the sprocket, the carrier will move into the next leg of the trackway, while maintaining its horizontal attitude. This construction is more fully described in our Patent No. 3,244,266 issued Apr. 5, 1966 for Lehr Loader.

The respective carriers 58, 59 and 60 carry neck ring assemblies 67, 68 and 69. Since the neck ring assemblies are identical, only one will be described in detail. Referring again to FIG. 12, it will be seen that the neck ring assembly 68 comprises mating halves 70 and 71 formed to provide a peripheral flange 72. The cross bar 65 is formed with a longitudinal slot 73 in which is received and supported a portion of the flange 72 of each neck ring half. The ring half 70 is provided with a support arm 74 extending toward the cross bar 66, and the ring half 71 is provided with a similar arm 75. Each of the arms 74 and 75 is formed with a transverse bore near its distal end slidably receiving the cross bar 66; and coiled springs 76 and 77 are sleeved on the cross bar 66 and confined respectively between the carrier side plates and said support arms to urge the neck ring halves into mating or closed relation.

As is more clearly to be seen in FIGS. 1 and 8, the distal ends of the arms 74 and 75 depend below the cross bar 66; and their mutually-facing surfaces are bevelled to define cam faces 78 and 79. Adjacent the lower, righthand corner of the transfer mechanism 38 a wedge block 80 is stationarily mounted in the path of the cam surfaces 78 and 79. Thus, as each carrier approaches that corner, the wedge surfaces 81 and 82 will respectively be engaged by the cam surfaces 78 and 79 whereby the neck ring halves will be forced apart in the manner suggested in dotted lines in FIG. 12. The condition there illustrated is attained as the carrier comes to a stop during travel of the proximal end of its arm 142 about the periphery of the sprocket 55. As the carrier thereafter begins to rise between the rail 42 and the surface 47, the lower ends of the arms 74 and 75 will leave the wedge 80 and the springs 76 and 77 will restore the neck ring halves to their solid line positions as illustrated in FIG. 1˙

Referring to FIGS. 3 and 14, a press assembly is indicated generally by the reference numeral 83. A bracket 84 is suitably supported as, for instance, from the stanchion 36, and a fluid motor 85 is mounted upon said bracket with its piston rod 86 extending downwardly below said bracket. Said piston rod is arranged to be coaxial with any one of the neck rings when such neck ring is in a dwell position at the upper lefthand corner of the transfer device 38. A press plunger assembly indicated generally by the reference numeral 87 is carried at the distal end of the piston rod 86.

Two or more guide rods 88, 88 are stationarily dependent from the bracket 84, and a plunger head 90, having an axial socket 91 in which is received the distal end of the piston rod 86, is formed with bushed guide bores 92, 93 slidably guided on said rods 88. Said plunger head 90 is formed to provide an axially elongated nose 94 which, at its distal end, is formed with a piston-like enlargement 95. A peripheral groove 96 is disposed above a reduced peripheral rib 97 for a purpose which will appear; and two inclined bores 98 penetrate the enlargement 95.

A tapered plunger 99, generally complementary to the interior of the parison mold 33 is formed near its upper end with a peripheral groove 100; and a lock ring 101 is provided to engage in the grooves 96 and 100 to secure the plunger 99 operatively to the nose 94 of the plunger head 90. Desirably, a conventional cooler element 102 is received within the plunger 99 and is provided with a peripheral flange 103 and an axial extension 104 as shown. A passage 105 formed in the plunger nose 94 communicates with the interior of the cooler element 102 and with a bore 106 in the piston rod 86 whereby coolant fluid may be fed to the cooler unit to be exhausted through the bores 98.

Figure 18:
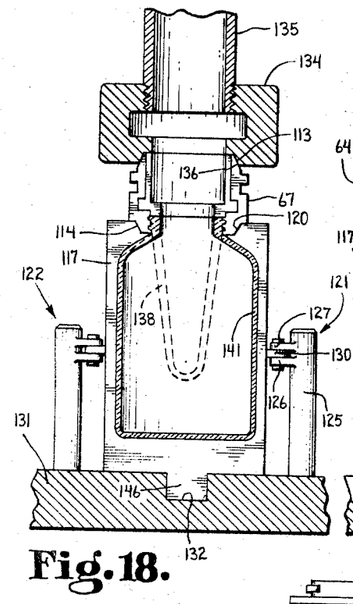
FIG. 18 (sheet 7) is a fragmentary section through the blow mold and blow head shown in blowing association with a loaded neck ring and taken on a plane parallel with the plane of FIG. 1.
Figure 19:
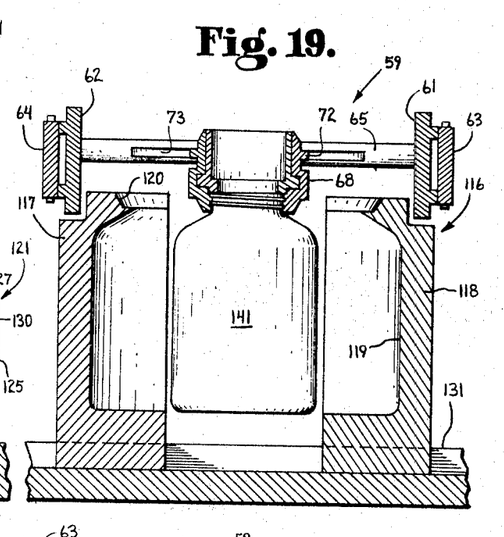
FIG. 19 (sheet 7) is a sectional view taken substantially on the line 11—11 of FIG. 5, but with the blow mold opened and the blow head withdrawn.

A sealing head 107 telescopes over the nose 94 and is provided with bushed bores 108 and 109 slidably guided on the rods 88. Said sealing head is formed with a cylindrical extension 110 in which the enlargement 95 is received to define a cavity 111 formed with ports (not shown) through which the coolant fluid may be exhausted. At its lower end, the extension 110 is formed with a flared sealing seat 112 for sealing engagement with the tapered sealing seat 113 (FIGS. 15 and 18) at the upper end of any one of the neck rings 67, 68 or 69.

A coiled spring 164 is confined between the plunger head 90 and the sealing head 107, resiliently urging the plunger head 90 upwardly relative to said sealing head.

A blow mold 116 is located at a point slightly to the right of the center of length of the lower run of the trackway 39. As is most clearly shown in FIGS. 16 to 19, said blow mold consists of separable halves 117 and 118, said mold halves being movable laterally relative to the direction of travel of neck rings on the lower run of the trackway 39. The blow mold halves, of course, are formed to define, when they are in closed relation, a cavity 119 conforming to the desired shape of the finished article to be manufactured, and they are further formed to define a flared sealing seat 120 at the upwardly-opening mouth of said cavity, conforming to the tapered sealing seat 114 at the lower end of each neck ring.

Toggle mechanisms 121, 122, 123 and 124 are arranged at the corners of the base 131 for the blow mold, the toggles 121 and 122 being operatively connected to the mold half 117 and the toggles 123 and 124 being operatively connected to the mold half 118. Since the several toggle mechanisms are of corresponding construction, only one will be described in detail.

A rock shaft 125 mounted upon an axis fixed relative to the base 131 carries a clevis arm 126. A link 127 has one end pivoted at 128 to an ear 129 fixed to the mold half 117, and has its other end pivotally connected at 130 to the clevis arm 126. When the parts are in the positions of FIG. 16, the pivot 130 will have been moved infinitesimally beyond dead center, so that the mold halves will be locked in closed position. When the rock shafts of the toggle mechanisms 121 and 124 are turned in a clockwise direction and the rock shafts of the toggle mechanisms 122 and 123 are turned in a counter-clockwise direction from the positions of FIG. 16 the mold halves will be equally and oppositely moved away from each other to the positions of FIG. 17. Suitable mechanism (not shown) will so move the parts as a carrier approaches the blow mold to admit a parison. Thereafter, the blow mold parts will be closed and held in that condition during the blowing step, whereafter the blow mold halves will again be separated to permit the carrier to move on, carrying with it the finished article 141. The toggle mechanisms, of course, will tend to move the mold parts rectilinearly; but said parts are preferably provided with depending toes 146 engaged in guide slots 132 and 133 in the base 131.

Arranged above the blow mold 116 for reciprocation relative thereto is a blow head 134 supported upon a reciprocable pipe 135 leading from a source (not shown) of air under pressure. When a parison, suspended from a neck ring, has been introduced into the blow mold and the blow mold has been closed, the blow head will descend to the position of FIG. 18 in which the flared sealing surface 136 of the blow head 134 sealingly engages the surface 113 of the neck ring and the surface 114 of the neck ring sealingly engages the flared sealing surface 120 of the blow mold.

*Operation*

Figure 20:
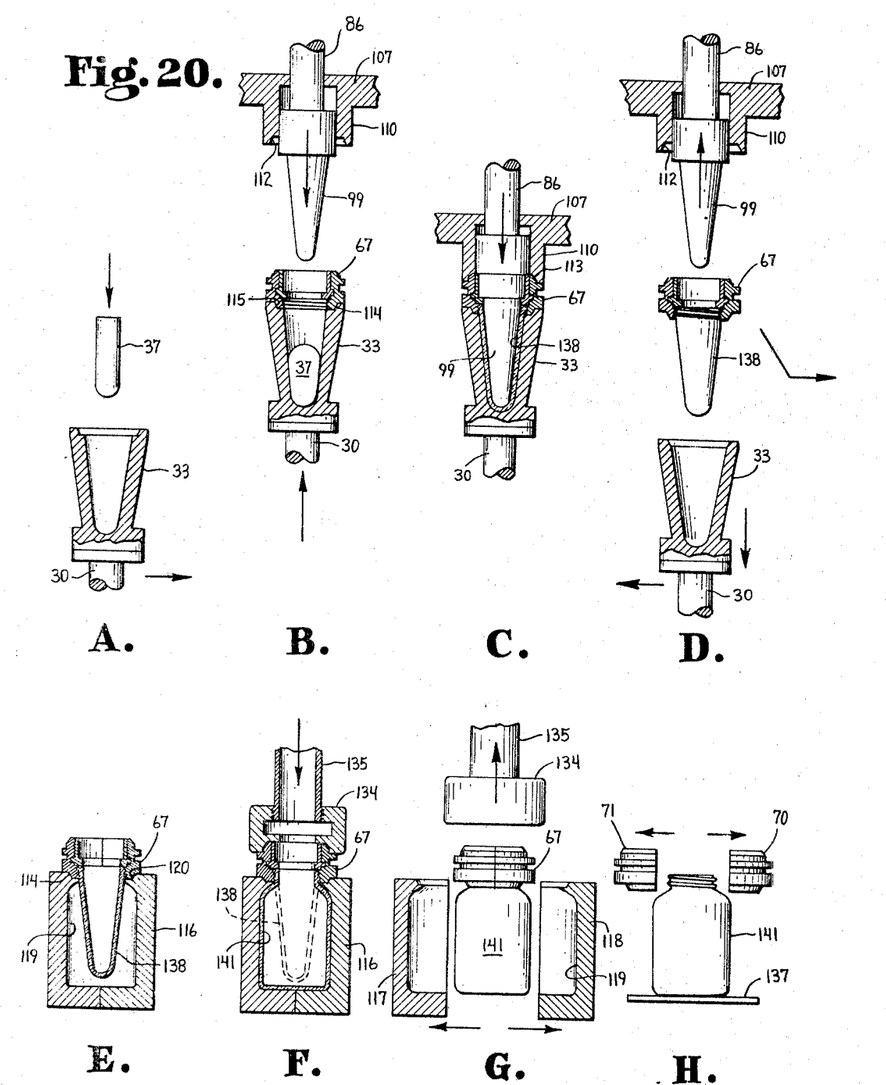
FIG. 20 (sheet 9) is a flow diagram illustrating successive steps in the pressing, blowing and discharging cycle of the machine herein disclosed.

The glassware forming cycle is illustrated somewhat diagrammatically in the eight views of FIG. 20. With the machine parts in the positions of FIG. 1 and view A of FIG. 20, a gob 37 of molten glass will be discharged from the delivery tube 34 to the parison mold 33. Now, the motor 24 will be energized to turn the turntable 26 in a clockwise direction as viewed in FIG. 6 to carry the parison mold and its elevator motor 28 to the position of FIG. 2. In this position, the parison mold 33 is directly aligned with the press assembly 83 and the neck ring 67 in the carrier 58. Now, through suitable timing mechanism (not shown), fluid under pressure is admitted to the reciprocating fluid motors 28 and 85, whereby the parison mold 33 containing its glass charge is lifted to bring its flared sealing surface 115 into engagement with the tapered sealing surface 114 of the neck ring 67 (view B of FIG. 20) and the press plunger assembly 87 is moved downwardly. The plunger 99 moves through the neck ring 67 and, as it engages the glass charge in the parison mold, the glass is caused to flow upwardly and into the neck ring 67. The sealing surface 112 engages the sealing surface 113 of the neck ring before the plunger 99 completes its stroke, thus arresting downward movement of the seal head 107, whereafter the head 90 continues to move downwardly, compressing the spring 164. This condition is illustrated in FIG. 14 and in view C of FIG. 20.

Just before the surfaces 112 and 113 come into engagement, the affirmative support arm 152 moves into blocking or supporting relation with the bottoms of the rods 148.

Figures 4, 15:
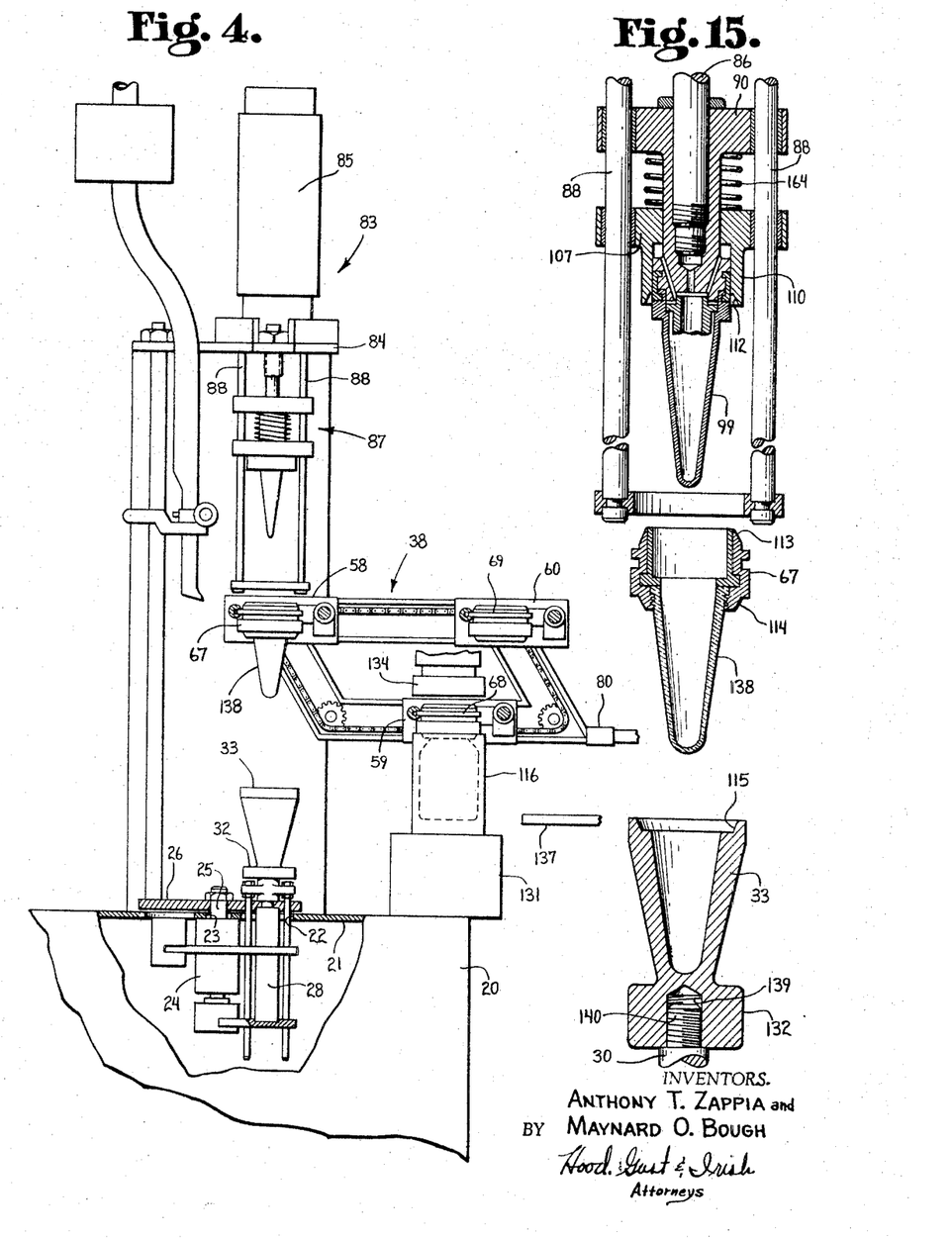
FIG. 4 (sheet 4) is a similar view showing the parison mold and the press plunger retracted and a parison suspended at the press station from a neck ring.
FIG. 15 (sheet 4) is a fragmentary sectional view showing the same parts illustrated in FIG. 14, but with the parison mold and press plunger head retracted and the parison suspended from the neck ring.

When the parison has been fully formed, the arm 152 will be withdrawn and the motors 28 and 85 will be actuated to retract the press plunger assembly 87 and parison mold 33, leaving the parison 138 suspended from the neck ring 67 in the manner illustrated in FIGS. 4 and 15 and in view D of FIG. 20. As soon as the mold 33 has cleared the parison 138, the motor 24 will be energized to turn the turntable 26 in a counter-clockwise direction to return the parison mold and its elevator mechanism to charging position as shown in FIGS. 1 and 5.

Figure 8:
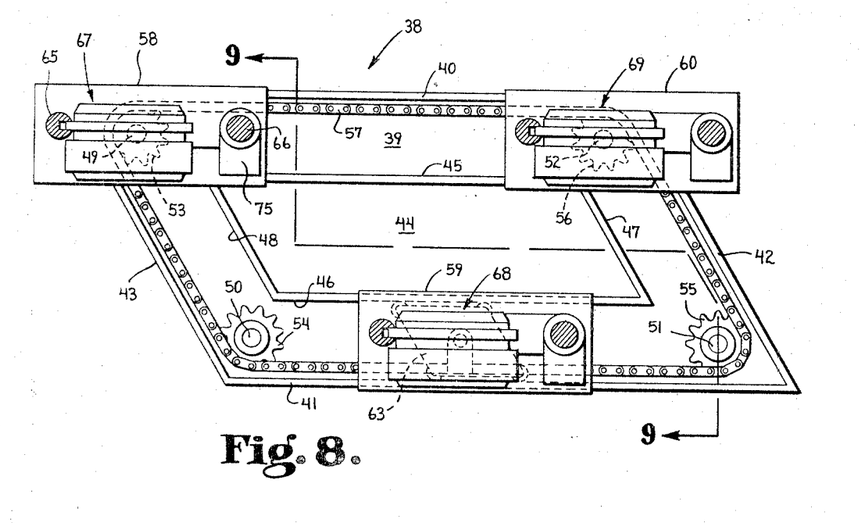
FIG. 8 (sheet 8) is an enlarged vertical section of the transfer mechanism which constitutes an important element of the present disclosure.

Now, as soon as the parison mold has been moved far enough to clear the path of the parison, the carriers 58, 59 and 60 will begin to move in a counter-clockwise direction as seen in FIG. 8 about the trackways 39. The blow mold parts will be separated and the carrier 58 will move from its position shown in FIG. 4 to its position shown in FIG. 5 whereupon the chain 57 will be stopped and the mold parts will be closed as shown in view E of FIG. 20. The blow head 134 will descend upon the neck ring 67 to establish the condition illustrated in FIG. 18 and in view F of FIG. 20. Air will now be admitted through the blow head to distend the parison 138 to the form of the finished article 141.

Figures 2, 7:
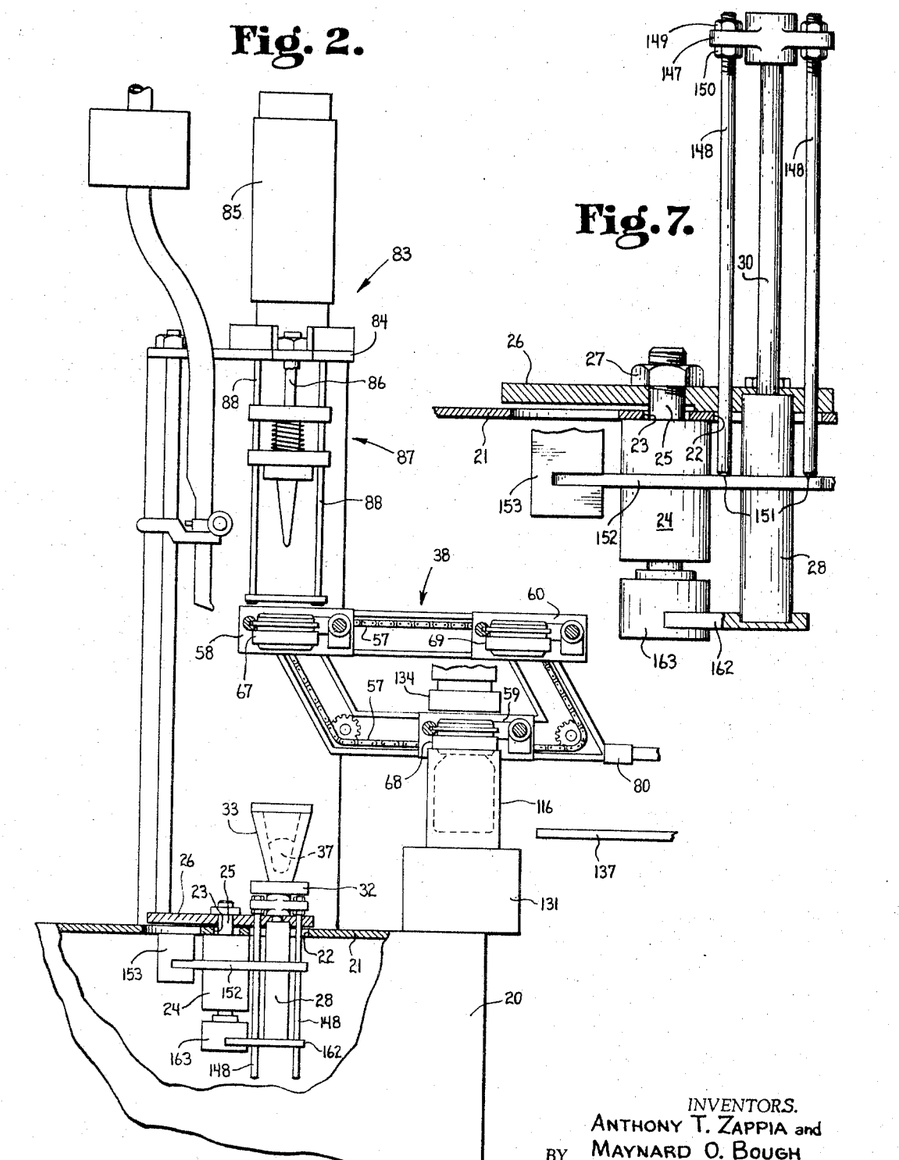
FIG. 2 (sheet 2) is a similar view showing the parison mold shifted into alignment with the press station.
FIG. 7 (sheet 2) is an enlarged fragmentary section of the turntable, its operating means and the parison mold elevating and supporting mechanism.
Figures 5, 6:
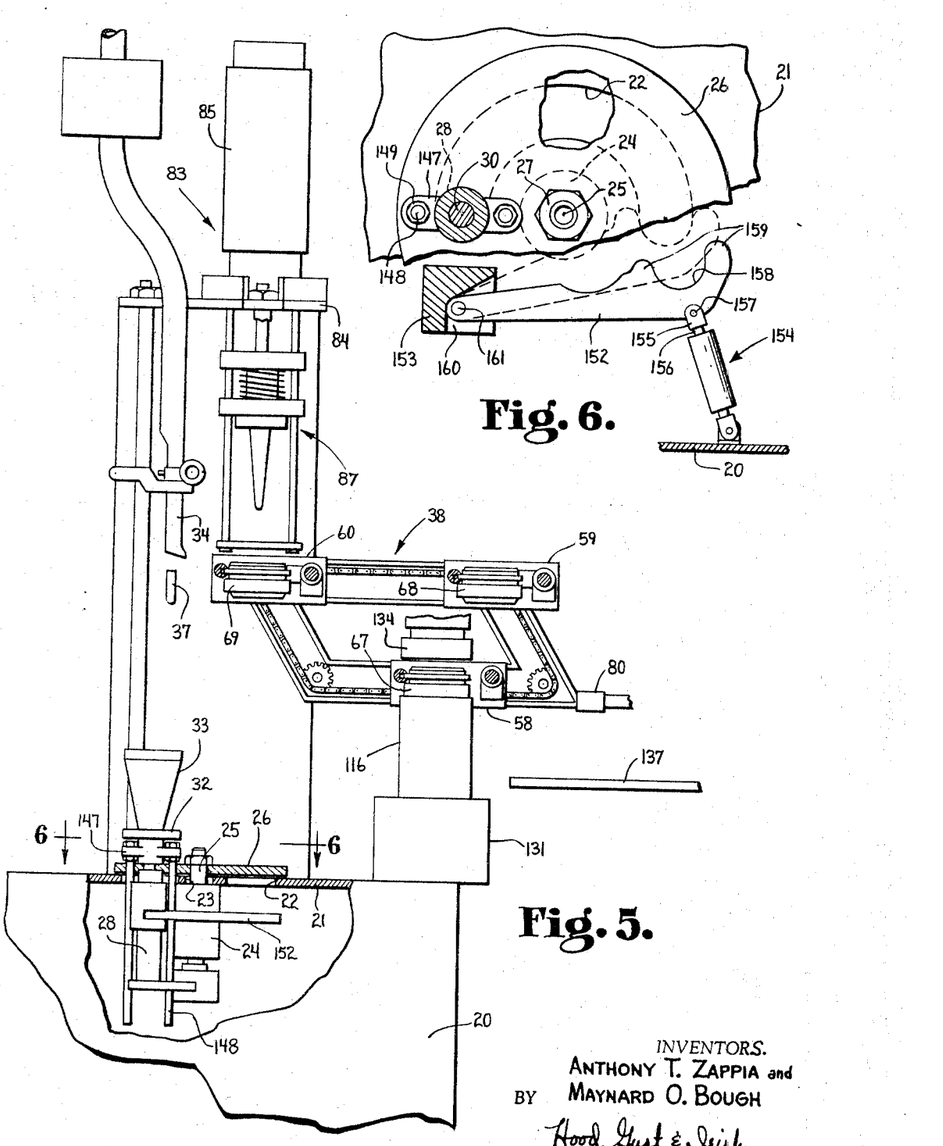
FIG. 5 (sheet 5) is a similar view showing the parison mold returned to the charging station and the parison-carrying neck ring advanced to registry with the blow mold and the parts in blowing position.
FIG. 6 (sheet 5) is an enlarged, fragmentary plan view taken substantially on the line 6—6 of FIG. 5.

During transit of the carrier 58 from its position of FIG. 4 to its position of FIG. 5, a new gob of molten glass will have been dropped into the parison mold 33; and as the parison carried by the carrier 58 enters the blow mold and the blow mold is closed, the motor 24 will again be actuated to move the parison mold to the position of FIG. 2. The carrier 60, of course, has concurrently moved from its position of FIG. 4 to its position of FIG. 5; and during the blowing operation, the press cycle will be repeated to form a parison suspended from the neck ring 69.

Upon completion of these steps, the blow head 134 is retracted, the blow mold opens (view G of FIG. 20) and the transfer mechanism 38 will again be energized to advance the chain 57. As the carrier 58 reaches the wedge 80, the neck ring 67 will be opened (view H of FIG. 20) to deposit the finished article 141 on the take-off conveyor 137; and as the carrier 60 reaches the blowing station, the carrier 58 will move on upwardly to the upper righthand corner of the trackway, while the carrier 59 aligns its neck ring 68 with the pressing station.

We claim as our invention:
1. In a machine of the class described, a charging station, a pressing station, a blowing station and a delivery station, an upwardly-opening parison mold, power means for moving said parison mold alternately between said charging station and said pressing station, a vertically reciprocable press plunger at said pressing station in vertical alignment with, and above, said parison mold when the latter is at said pressing station, a blow mold at said blowing station, a plurality of identical neck rings, each neck ring consisting of a plurality of mating, transaxially-separable segments, transfer mechanism comprising an endless, flexible strand, a series of rotors about which said strand is trained to pass said pressing station, said blowing station and said delivery station serially in that order, said neck rings being serially operatively connected with said strand to move therewith and certain of said rings being spaced apart a distance equal to the travel distance of said strand between said pressing station and said blowing station, power means operatively connected to one of said rotors to drive said strand intermittently to stop said rings successively at said pressing station in vertical registry between said press plunger and said parison mold with another of said rings concurrently at said blowing station, means at said blowing station operative to close said blow mold each time said strand stops and to open said blow mold before said strand restarts, and cam means stationarily mounted at said delivery station and cooperatively engageable with each of said rings as the latter leaves said blowing station to separate the segments thereof.

2. The machine of claim 1 in which the travel path of said strand is generally downwardly and laterally in one direction from said pressing station to said blowing station, generally laterally in the same direction from said blowing station to said delivery station, and generally upwardly and laterally in the opposite direction from said delivery station to said pressing station.

3. The machine of claim 2 in which said blow mold comprises mating sections arranged with their plane of juncture in the path of a parison depending from a neck ring as such neck ring travels with said strand from said pressing station toward said delivery station, and means for moving said sections oppositely and rectilinearly transversely with respect to said path to open said blow mold for the reception of such a parison and to close the same for blowing.

4. The machine of claim 3 in which each such section is formed with a surface proportioned and designed for sealing engagement with a mating surface of a neck ring upon closure of said blow mold when a neck ring is at said blowing station.

5. The machine of claim 2 including a carrier for each neck ring, each such carrier including a bar extending transversely relative to the line of travel of said strand, each neck ring comprising two mating segments separable on a median plane parallel with the line of travel of said strand, each such segment having a forwardly-extending arm slidably supported on said bar, and means yieldably urging said arms, and therefore said segments, toward each other, said arms being formed to provide surfaces engageable with said cam means to separate said segments as said ring achieves registry with said delivery station.

6. The machine of claim 2 including a carrier for each neck ring, each such carrier including a bar extending transversely relative to the line of travel of said strand, each neck ring comprising two mating segments separable on a median plane parallel with the line of travel of said strand, each such segment having a forwardly-extending arm slidably supported on said bar, and means yieldably urging said arms, and therefore said segments, toward each other, said arms being formed to provide surfaces depending below said bar and positioned respectively to engage laterally-opposite surfaces of said cam means as said ring approaches said delivery station, to separate said arms against the tendency of said yieldable means, thereby opening said ring to deposit an article carried thereby at said delivery station.

7. The machine of claim 6 in which the travel path of said strand is so related to said cam means that said depending arm surfaces are moved generally upwardly, after such deposit, out of engagement with said cam means, whereby said ring is elevated to clear the article so deposited before said yieldable means is permitted to close said ring.

8. The machine of claim 1 in which said transfer mechanism includes two endless, flexible strands, each trained about a series of rotors to follow laterally-spaced, corresponding paths generally downwardly and laterally in one direction from said pressing station to said blowing station, generally laterally in the same direction from said blowing station to said delivery station, and generally upwardly and laterally in the opposite direction from said delivery station to said pressing station, a carrier for each such neck ring, each such carrier comprising a pair of side plates, each operatively connected to move with one of said strands, a first bar spanning said side plates, a second bar spanning said side plates and rearwardly spaced from said first bar, each neck ring comprising two mating segments separable on a median plane parallel with the lines of travel of said strands, each such segment having a forwardly-extending arm slidably supported on said first bar and each such segment being slidably supported from said second bar, and spring means engaging said arms and yieldably urging said arms, and therefore said segments, toward each other, said arms being formed to provide surfaces engageable with said cam means to separate said segments as said ring achieves registry with said delivery station.

9. In a machine of the class described, a base providing a substantially horizontal floor formed with an opening and with a substantially semi-circular slot concentric with said opening, an oscillating motor disposed below said floor and having an output spindle penetrating said opening, a turntable drivingly fixed to said spindle above said floor and formed with an eccentric aperture therethrough registering with said slot, a reciprocating fluid motor having a portion disposed below said floor and a vertically reciprocating portion disposed above said turntable, said motor penetrating said slot and said aperture, and a parison mold carried by said reciprocating portion and registering with a charging station when said reciprocating motor is at one end of said slot and with a press plunger when said reciprocating motor is at the other end of said slot.

10. In a machine of the class described, a base providing a substantially horizontal floor formed with an opening and with a substantially semi-circular slot concentric with said opening, an oscillating motor disposed below said floor and having an output spindle whose upper end penetrates said opening, a turntable drivingly fixed to said spindle upper end above said floor and formed with an eccentric aperture therethrough registering with said slot, an arm fixed to the lower end of said spindle, a reciprocating motor comprising a cylinder supported on said arm, penetrating said slot and fixed to said turntable and a piston rod penetrating said aperture, and a parison mold carried by said piston rod above said turntable and registering with a charging station when said reciprocating motor is at one end of said slot and with a press plunger when said reciprocating motor is at the other end of said slot.

11. In a machine of the class described, a base providing a substantially horizontal floor formed with an opening and with a substantially semi-circular slot concentric with said opening, an oscillating motor disposed below said floor and having an output spindle whose upper end penetrates said opening, a turntable drivingly fixed to said spindle upper end above said floor and formed with an eccentric aperture therethrough registering with said slot, an arm fixed to the lower end of said spindle, a reciprocating motor comprising a cylinder supported on said arm, penetrating said slot and fixed to said turntable and a piston rod penetrating said aperture, a guide rod parallel with said piston rod, laterally offset therefrom and fixed to move therewith, said guide rod having a lower end, a vertically-fixed support mounted to swing about an external axis into and out of the path of the lower end of said guide rod at a level substantially coincident with that of said lower end of said guide rod when said piston rod is at its maximum elevation, power means for swinging said support into underlying engagement with said guide rod lower end only when said piston rod is at its maximum elevation, and a parison mold carried by said piston rod above said turntable and registering with a charging station when said reciprocating motor is at one end of said slot and with a press plunger when said reciprocating motor is at the other end of said slot.

References Cited

UNITED STATES PATENTS

| 690,119 | 12/1901 | O'Neill | 65—307 |
|---|---|---|---|
| 687,595 | 11/1901 | Blue | 65—229 |
| 733,805 | 7/1903 | Blue | 65—240 XR |
| 1,576,114 | 3/1926 | Glaspey | 65—231 |

FOREIGN PATENTS 449,676  10/1912  France.

DONALL H. SYLVESTER, *Primary Examiner.*

F. W. MIGA, *Assistant Examiner.*

U.S. Cl. X.R.

65—226, 237, 239, 241, 242, 307, 317, 361, 229

UNITED STATES PATENT OFFICE
CERTIFICATE OF CORRECTION

Patent No. 3,434,820

March 25, 1969

Anthony T. Zappia et al.

It is certified that error appears in the above identified patent and that said Letters Patent are hereby corrected as shown below:

Column 1, line 20, "through" should read -- though --; line 38, after "pressing" insert -- station to a blowing station and thence to a take-off -- Column 3, line 61, "aand" should read -- and --. Column 4, line 35, after "FIG." insert -- 12 --. Column 7, line 64, "deposite" should read -- deposit --.

Signed and sealed this 7th day of April 1970.

(SEAL)

Attest:

Edward M. Fletcher, Jr.

Attesting Officer

WILLIAM E. SCHUYLER, JR

Commissioner of Patents